(12) United States Patent
Verbil et al.

(10) Patent No.: US 7,076,044 B2
(45) Date of Patent: Jul. 11, 2006

(54) CALL QUEUING NOTIFICATION

(75) Inventors: John M. Verbil, Scottsdale, AZ (US); Robert Eric Pflum, Phoenix, AZ (US)

(73) Assignee: Qwest Communications International, Inc., Denver, CO (US)

(*) Notice: Subject to any disclaimer, the term of this patent is extended or adjusted under 35 U.S.C. 154(b) by 1004 days.

(21) Appl. No.: 09/802,075

(22) Filed: Mar. 8, 2001

(65) Prior Publication Data

US 2001/0009546 A1   Jul. 26, 2001

Related U.S. Application Data

(63) Continuation-in-part of application No. 09/159,940, filed on Sep. 24, 1998, which is a continuation of application No. 08/806,973, filed on Feb. 26, 1997, now Pat. No. 5,844,896.

(51) Int. Cl.
*H04M 3/42*   (2006.01)

(52) U.S. Cl. .............................. 379/209.01; 379/265.01; 379/265.11; 379/266.01

(58) Field of Classification Search .......... 379/209.01, 379/265.01, 265.11, 266.01
See application file for complete search history.

(56) References Cited

U.S. PATENT DOCUMENTS

| | | | | |
|---|---|---|---|---|
| 5,140,626 A | * | 8/1992 | Ory et al. | 340/7.62 |
| 5,440,623 A | | 8/1995 | Moore et al. | 379/88.26 |
| 5,610,912 A | | 3/1997 | Johnston | 370/359 |
| 5,633,924 A | | 5/1997 | Kaish et al. | 379/266.03 |
| 5,652,789 A | * | 7/1997 | Miner et al. | 379/201.01 |
| 5,652,790 A | | 7/1997 | Andruska et al. | 379/230 |
| 5,696,809 A | | 12/1997 | Voit | 379/22.01 |
| 5,701,301 A | | 12/1997 | Weisser, Jr. | 370/428 |
| 5,742,675 A | * | 4/1998 | Kilander et al. | 379/266.09 |
| 5,844,896 A | | 12/1998 | Marks et al. | 370/385 |
| 5,978,467 A | * | 11/1999 | Walker et al. | 379/266.01 |
| 5,982,859 A | * | 11/1999 | Meek et al. | 379/100.01 |
| 6,064,730 A | * | 5/2000 | Ginsberg | 379/265.09 |
| 6,212,261 B1 | * | 4/2001 | Meubus et al. | 379/88.12 |

* cited by examiner

*Primary Examiner*—Ahmad F. Matar
*Assistant Examiner*—Quynh H. Nguyen (57) ABSTRACT

Call queuing is implemented in a telecommunications advanced intelligent network. After a call to a busy subscriber line in queued, a separate call to the subscriber is placed indicating status of the queued subscriber line access call. Call queuing and status notification may be accomplished with an intelligent peripheral. The subscriber notification may be made by placing a wireline call or by wireless notification, such as through a paging system.

37 Claims, 6 Drawing Sheets

CALL QUEUING NOTIFICATION

CROSS-REFERENCE TO RELATED APPLICATIONS

This application is a continuation-in-part of U.S. application Ser. No. 09/159,940, filed Sep. 24, 1998, which, in turn, is a continuation of Ser. No. 08/806,973, now U.S. Pat. No. 5,844,896, filed Feb. 26, 1997, each of which is incorporated by reference herein.

BACKGROUND OF THE INVENTION

1. Field of the Invention

This invention relates to telecommunications network-based call queuing operations.

2. Background Art

For businesses that receive many phone calls per day, it is common for a telephone company to provide such subscribers with more than a single incoming telephone line on which to receive calls. These multiple lines are commonly configured as a hunt group. The hunt group has a telephone number associated with it which, when dialed, causes a telephone routing system to attempt to connect the call to each of the incoming telephone lines until an idle line is found.

Many businesses also subscribe to voice messaging or queuing services provided by their telephone company. In such systems, if all the telephone lines in the hunt group are busy or go unanswered, the voice messaging system (VMS) generates a computer-activated message instructing the caller to leave a message. The message is then recorded by the voice messaging system and is stored in a computer, thereby allowing subscribers to listen to the recorded messages and call back the customers who were unable to get through. With queuing services, if all the telephone lines in the hunt group are busy, a computer-activated message is similarly generated instructing the caller that all operators are currently busy, and that the call will be answered in the order received.

While the above call handling features have worked well for the majority of call handling situations, they have their drawbacks. Namely, neither feature allows a caller to choose whether to leave a message or to remain on the line while a call is answered. One solution overcomes this problem through use of a switch-based approach. For example, programmable central office switches may provide prioritized features to a telephone number including queuing, Call Forward Don't Answer to the voice messaging system, and Call Forward Busy Line to the voice messaging system. The routing system typically includes a set of incoming telephone lines that are configured as a multi-line hunt group having a Hunt Group Directory Number associated with it. The Hunt Group Directory Number has queuing, Call Forward Line to the VMS and Call Forward Don't Answer to the VMS features enabled. The multi-line hunt group has further associated with it a set of individual hunt group telephone numbers that are matched to each of the incoming telephone lines. Each individual hunt group telephone number has the features Call Forward Busy Line to the VMS and Call Forward Don't Answer to the VMS enabled, but does not have a queuing feature enabled.

While a switch-based approach combines queuing and voice messaging features with existing telephone switching and voice messaging hardware, it does so at a cost which has limited its use to larger business customers. Moreover, because the approach is switch based, it is inapplicable to next generation network system, namely an Advanced Intelligent Network (AIN).

Consequently, a need exists for a system and method which permits residential customers and small to medium sized business customers the ability to place incoming calls in a queue when all of their lines are busy for later retrieval. Such a system and method should obviate the need for a subscriber to purchase telephone lines equivalent to the maximum queue size as well as the hardware needed to provide such queuing function. Subscribers should not be required to purchase any additional telephone lines or hardware to provide the required queuing function. Further, queues should be managed so as to permit status of queued calls to be forwarded to the subscriber.

SUMMARY OF THE INVENTION

The present invention places calls in a network-based queue if a subscriber line is busy. The subscriber is notified of the status of queued calls by placing a separate call. This separate call may be placed directly to the subscriber or to a secondary communication system such as, for example, a paging system.

A method of call queuing notification implemented in a telecommunications advanced intelligent network is provided. A call to access a subscriber line is received. A determination is made that the subscriber line is busy. The subscriber line access call is placed in a network-based queue associated with the subscriber line. A separate call is placed indicating status of the queued subscriber line access call.

In an embodiment of the present invention, a determination is made that the subscriber has requested call notification before the separate call indicating queued subscriber line access call status is placed.

In another embodiment of the present invention, the call indicating queued subscriber line access call status is based on information about the received call.

In yet another embodiment of the present invention, at least one command is received from the subscriber in response to placing the separate call indicating queued subscriber line access call status. Such command may perform a variety of functions. For example, the command may connect the queued call to the subscriber over a line used to place the separate call. As another option, the command may move the queued call to the front of the queue.

In other embodiments of the present invention, the separate call is placed substantially when the call to the subscriber is queued. The separate call may also be placed based on some event such as the passage of time, the length of time that the call to the subscriber is queued, the number of calls queued, and the like.

A system for call queue notification implemented in an AIN having at least one central office switch and a service control point is also provided. An intelligent peripheral is equipped with queuing functionality for each subscriber. The intelligent peripheral places a first call to the central office switch for receipt by a subscriber having a call placed in queue in response to a determination that a line associated with the subscriber is idle. The intelligent peripheral also places a second call providing status information to the subscriber about at least one queued call.

A method for notifying a subscriber of queued call status is also provided. The call, which is placed from a caller to a subscriber line, is processed by an AIN having at least one central office switch and a service control point. An intelligent peripheral equipped with queuing functionality is provided. A first call to access the subscriber line is received. A determination is made that the subscriber line is busy. The first call is queued in the intelligent peripheral. A second call is placed from the intelligent peripheral indicating status of the queued first call.

In an embodiment of the present invention, the method further includes monitoring the subscriber line to notify the SCP when the line is idle. A third call is placed from the intelligent peripheral to the subscriber in response to a determination that the subscriber line is idle. Answer supervision is forwarded to the intelligent peripheral in response to the third call being answered by the subscriber. The subscriber and caller are transferred and connected at the central office switch.

In another embodiment of the present invention, the method further includes monitoring call signaling to detect a termination attempt trigger. A query is launched at the SCP for receipt by the intelligent peripheral requesting the queue status of the subscriber line in response to the detected termination attempt trigger. The call is forwarded to the intelligent peripheral to be added to the queue in response to a determination that the queue is active. The call is delivered to the subscriber and a next event list trigger is set to determine the status of the subscriber line in response to a determination that the queue is empty. The call is connected to the subscriber line in response to a determination that the line is idle. The call is forwarded to the intelligent peripheral to be placed in queue in response to a determination that the subscriber line is busy.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
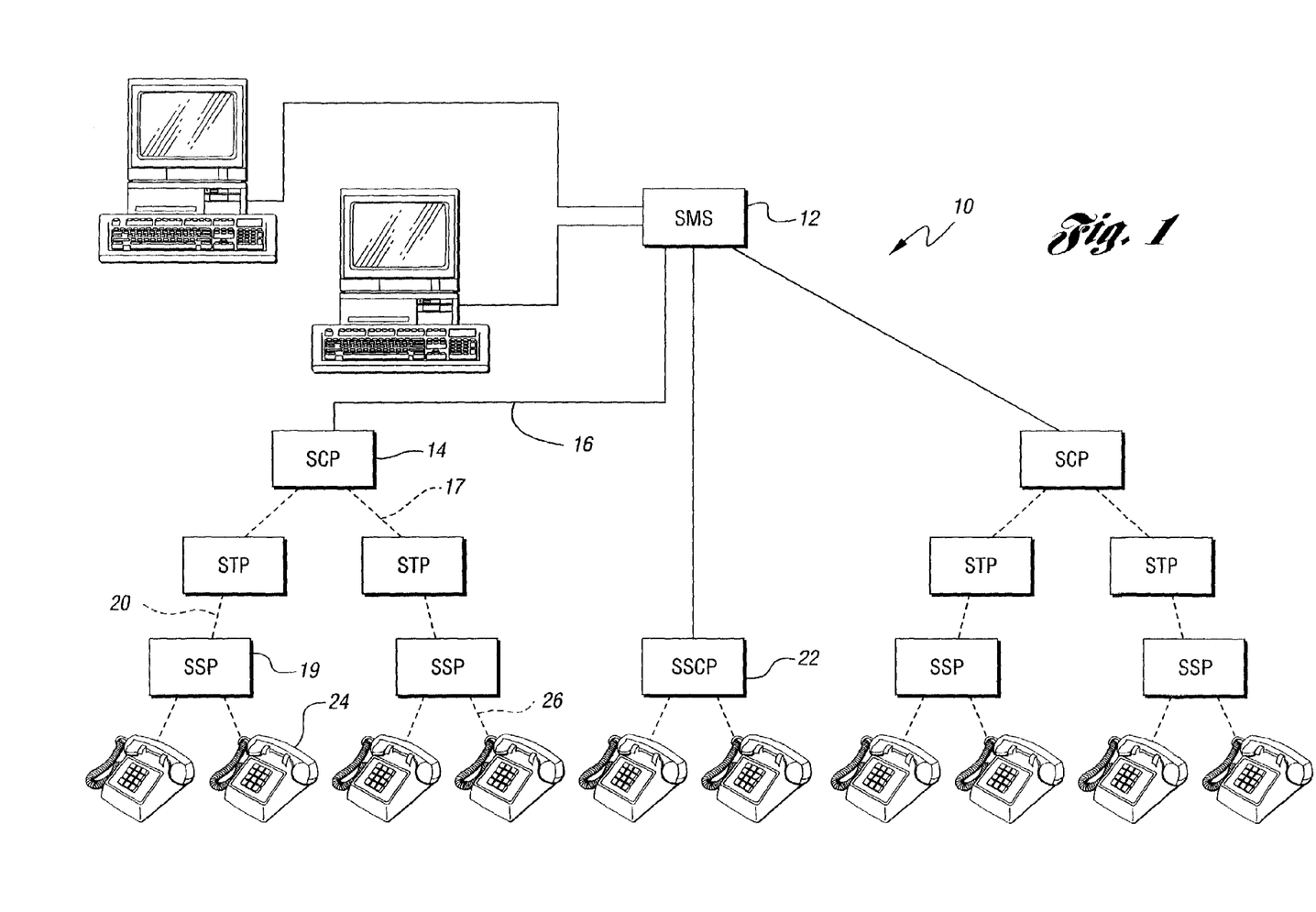
FIG. 1 is a block diagram of a representative Advanced Intelligent Network (AIN)

With reference to FIG. 1 of the drawings, a schematic diagram of a representative Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with common channel Signaling System No. 7 (SS7) protocol. SS7 generally operates at 56 kbps and can support variable message lengths up to 2,176 bits (272 octets) of information per message.

As is known in the art, the SS7 network may be comprised of various package switching elements and transmission links, some of which are shown. As seen, there is also provided service management system (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of service control points (SCPs)/adjuncts 14 via wide area network management links 16. Again, as those skilled in the art will recognize, AIN service control points 14 are nodes which contain the service logic and associated data support to execute the required customer services.

Still further, there is provided signal transfer points (STPs) 18 in electrical communication with SCP/adjunct 14 via signaling links 17. Service transfer points 18 are packet switches used to route signaling messages within the network. Service switching points (SSPs) 19 are also provided. Service switching points 19 are generally nodes, usually the subscriber local switch or central office switch, which recognize the triggers generated when a subscriber's service invokes an intelligent network trigger and then communicates with the SCP to operate the service.

As shown, service switching points 19 are provided in electrical communication with signal transfer points 18 via signaling links 20. In limited traffic situations, service switching and control points (SSCPs) 22 may also be provided for combining the functions of the SCP and SSP. Subscribers 24 have at least one customer premises equipment (CPE) device such as a telephone, facsimile machine, voice messaging peripheral, modem, or the like. As shown, CPE devices 24 are provided in electrical communication with service switching points 19 (COS) via telephone lines 26.

The AIN architecture referred to above is known to permit services to be extended throughout the network. In operation, new services are typically installed on two SCP processing platforms for directly servicing a selected market. In operation, this service management system extends management and control to the remote service control points/adjuncts via a signaling network.

Figure 2:
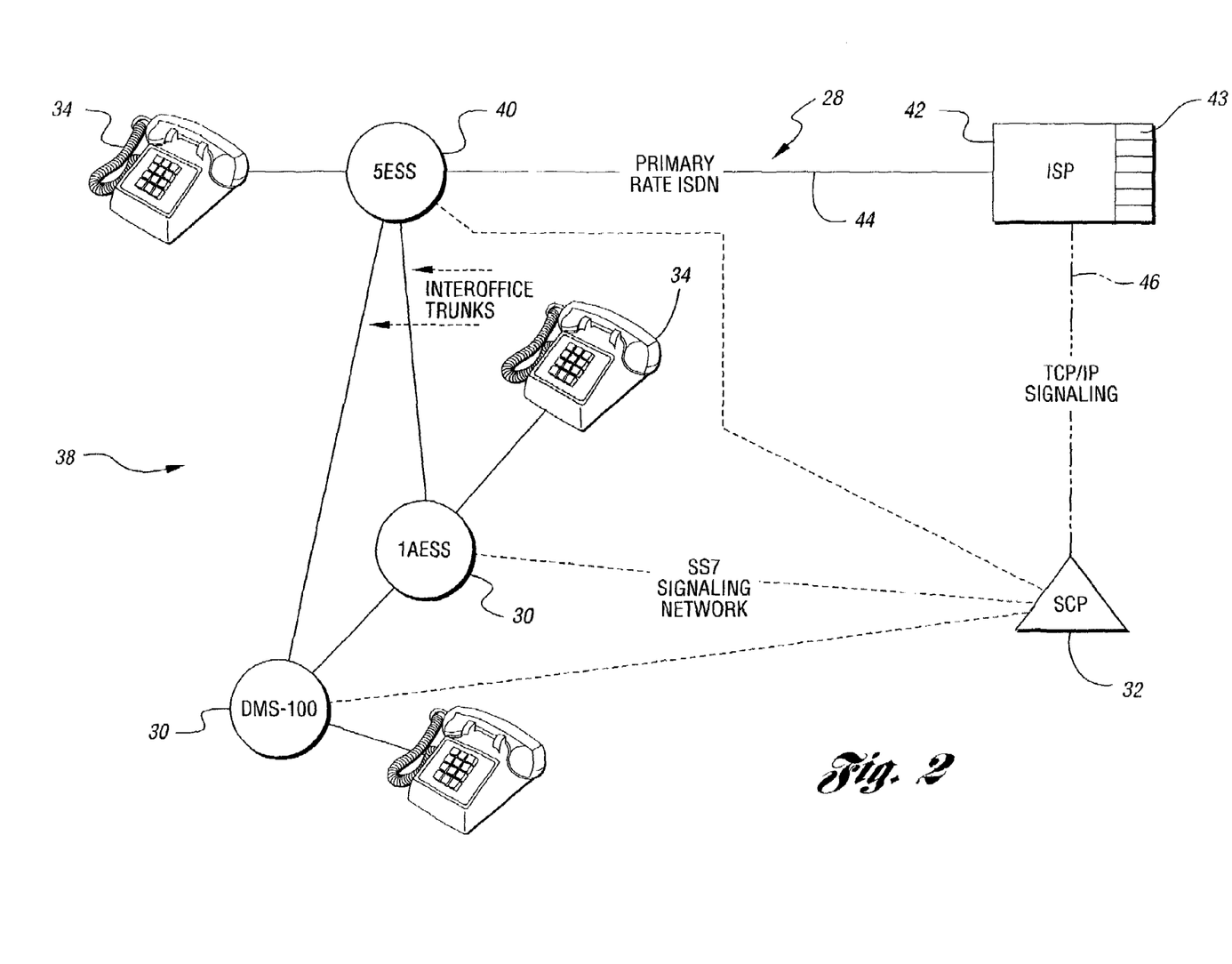
FIG. 2 is a block diagram of a telephone routing system operative to carry out the method of the present invention.

Turning now to FIG. 2, there is shown a schematic diagram of a system used to implement the method of the present invention. The system, which is designated generally by reference numeral 28, includes at least one subscriber switch 30 which is provided in electrical communication with at least one service control point 32 and at least one, preferably a plurality of, subscribers 34 so as to define an Advanced Intelligent Network 38. The Advanced Intelligent Network is equipped with Termination Attempt Trigger and terminating Next Event List functionality, the operation of which is well known to those skilled in the art and therefore need not be discussed here in further detail.

One of the switches 40 in system 28 may be designated as a host central office switch by virtue of the fact that it is provided in electrical communication with an intelligent peripheral (IP) 42 implementing one or more queues 43. The intelligent peripheral 42 is preferably, but not necessarily, a Bellcore Intelligent Services Peripheral which is provided in electrical communication with the host central office switch 40 via Primary Rate Integrated Services Digital Network (ISDN) links 44 and further provided in electrical communication with SCP 32 via TCP/IP (wide area network) signaling 46. In further keeping with the invention, each of the subscribers 34 maintains a dedicated and preferably, but not necessarily, subscriber programmable number of queuing slots within intelligent peripheral 42.

Figure 3:
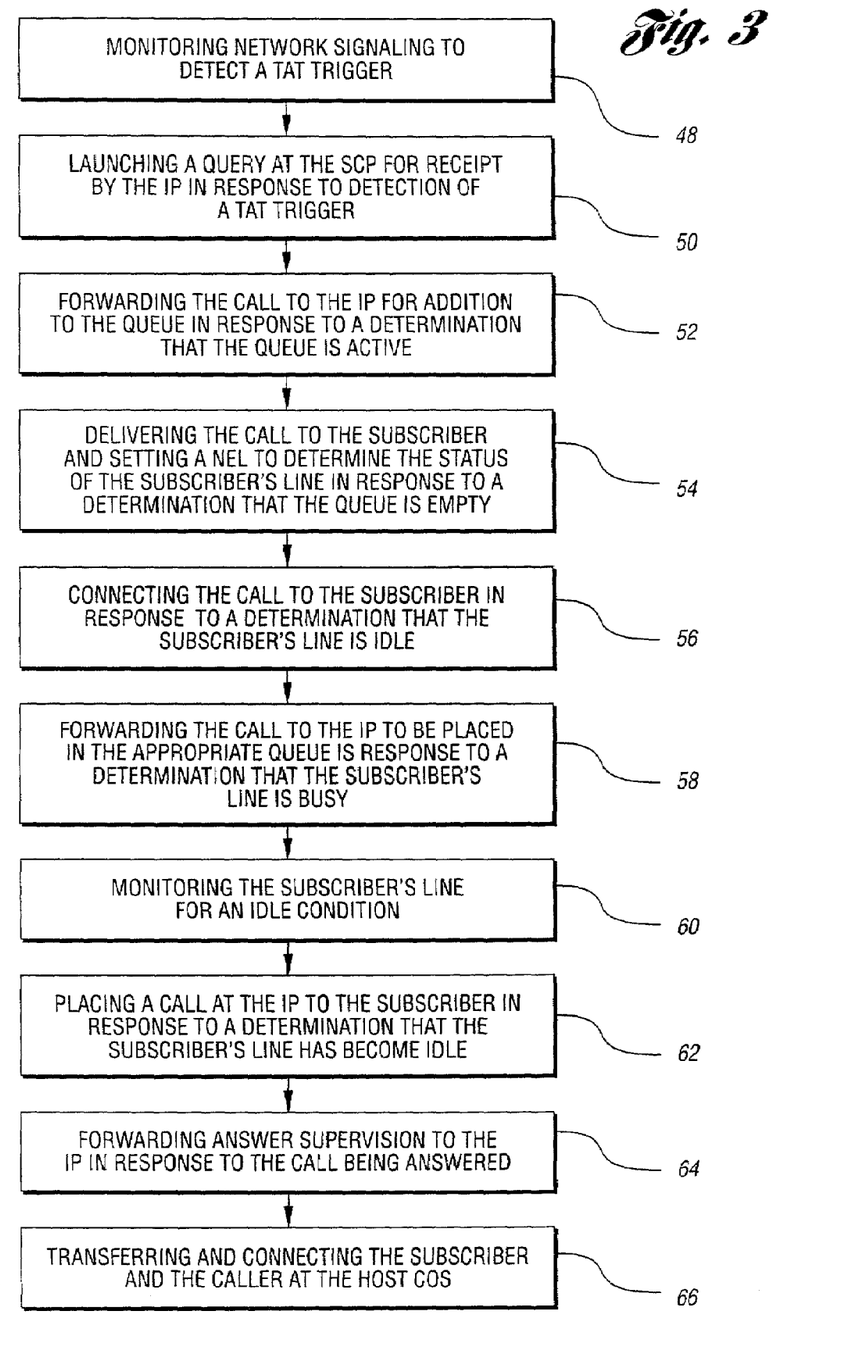
FIG. 3 is a block diagram illustrating the method steps of queuing and connecting a caller and a subscriber according to an embodiment of the present invention.
Figure 4:
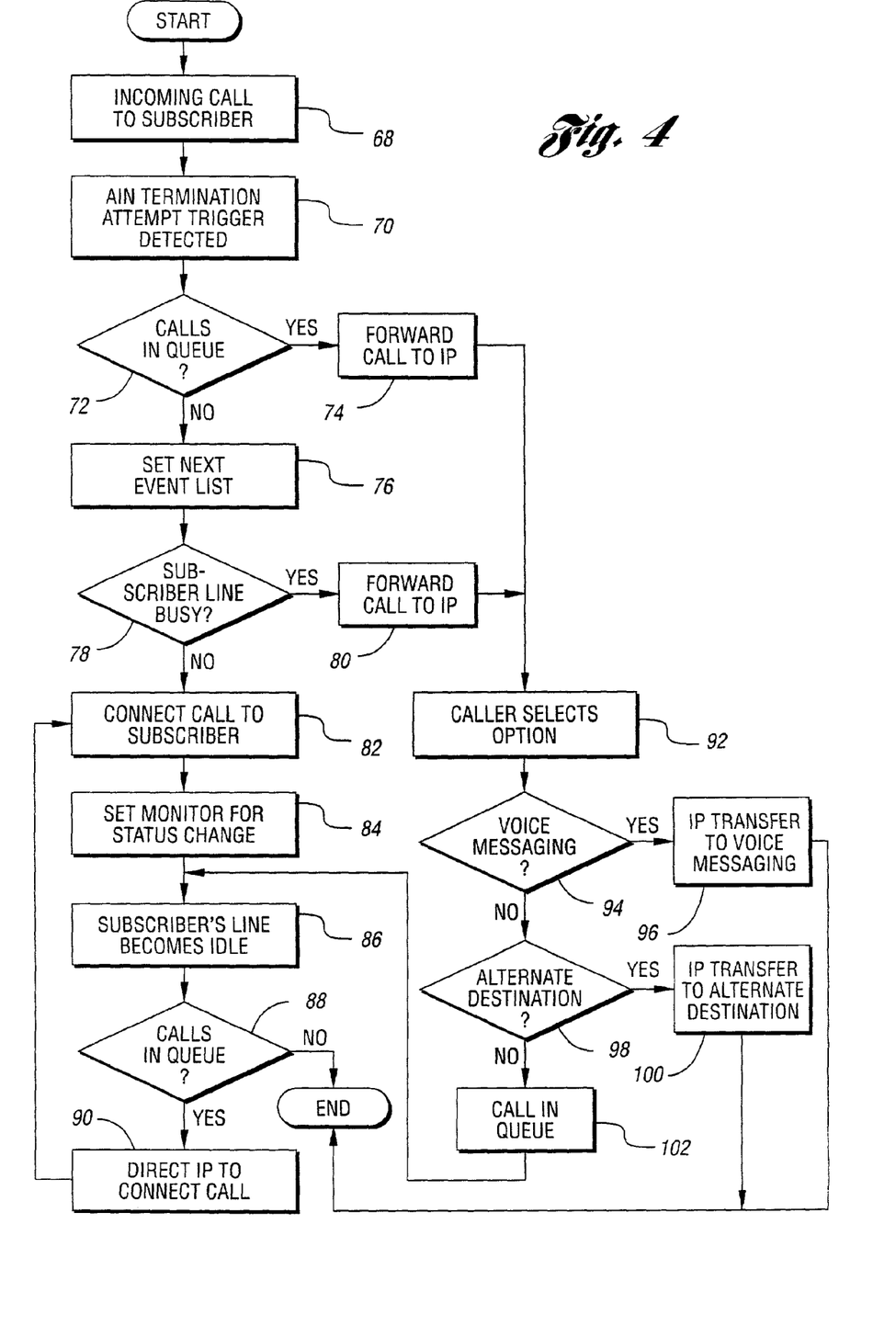
FIG. 4 is a detailed flow diagram illustrating a method for queuing and servicing calls to a subscriber line according to an embodiment of the present invention.
Figure 6:
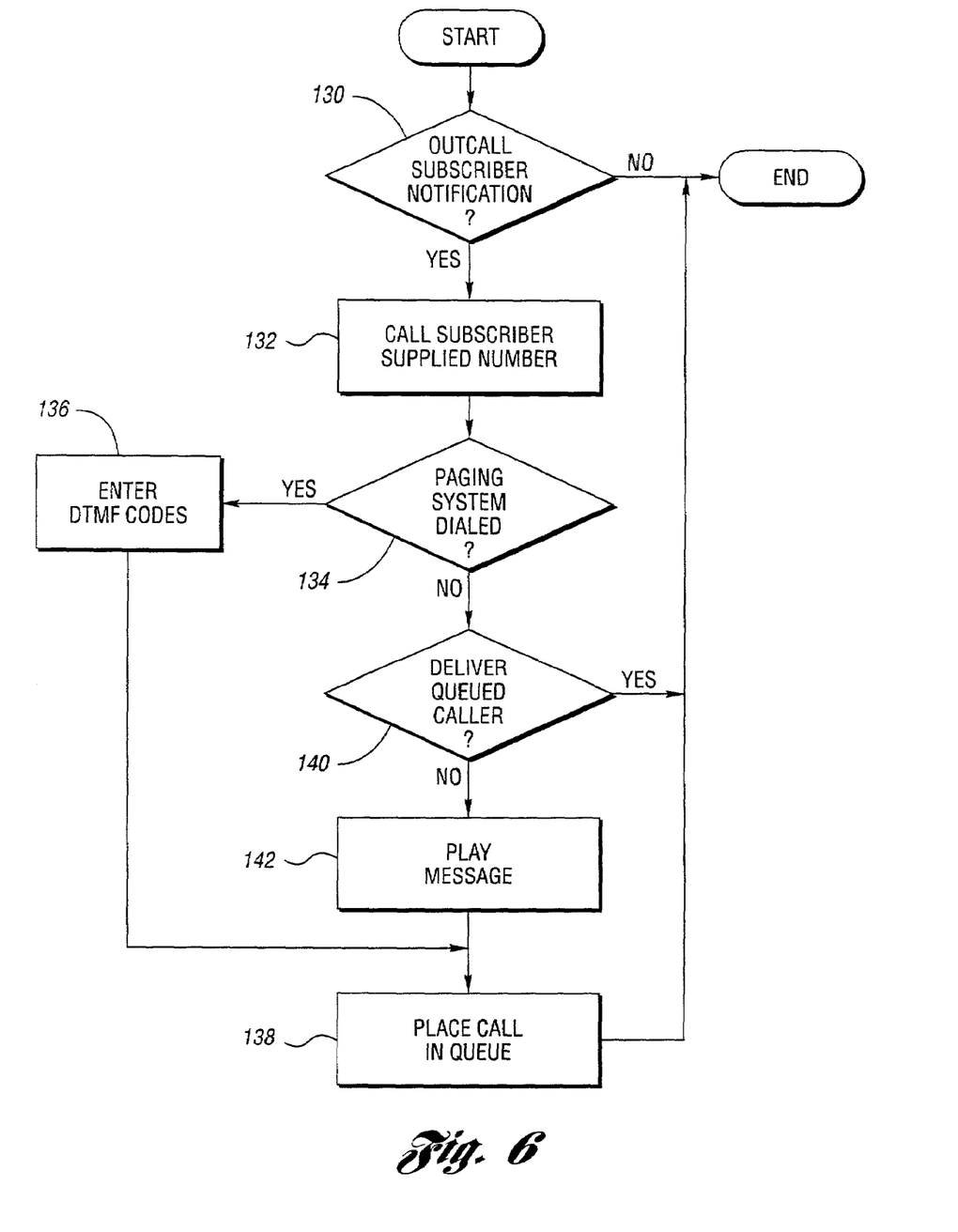
FIG. 6 is a flow diagram of queued call status notification according to an embodiment of the present invention.

Referring to FIGS. 3, 4 and 6, diagrams illustrating call queuing notification according to embodiments of the present invention are shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

As discussed above, the method may be implemented in an Advanced Intelligent Network, such as that illustrated in system 28 of FIG. 2, which is equipped with Termination Attempt Trigger (TAT) and Next Event List (NEL) functionality. Queuing system 28 includes intelligent processor 42 equipped with queuing functionality to provide a platform for the present invention.

In operation, network signaling is monitored 48 for detection of a TAT trigger. Upon detection of a TAT trigger, a query is launched 50 at the SCP. The query is launched in response to the detected TAT trigger and is operative to request the queue status of the subscriber line. If, in response to the SCP query, the queue is determined to be active, the call is forwarded 52 to the IP for addition to the queue. In contrast, if the queue is determined to be empty, the call is delivered 54 to the subscriber and a NEL is set to determine the status of the subscriber line. Of course, if the subscriber line is idle, the call will be connected 56 to the subscriber. Alternatively, if it is determined that the subscriber line is busy, the call will be forwarded 58 to the IP to be placed in the appropriate queue.

The subscriber line is thereafter monitored for an idle condition. If an idle condition is detected, a call is placed from the IP to the subscriber. Upon being answered, answer supervision is forwarded to the IP whereupon the subscriber is connected to the IP and an announcement is played telling the subscriber the number of calls currently stacked (waiting) in queue. The call is then transferred at the host COS where the caller and subscriber are connected.

The above described method may be further understood by reference to the detailed flow diagram of FIG. 4. As shown in block 68, the network attempts to deliver a call to the subscriber. As part of call processing, the network encounters a Termination Attempt Trigger (TAT), as shown in block 70. A check is made at block 72 to determine if the subscriber already has other calls in queue. If there are calls already in queue, the network is directed to forward this call to the IP for further processing, as shown in block 74. If there are no calls in queue, the network is directed to set the Next Event List, as shown in block 76, and attempt to connect to the subscriber line.

If the subscriber line is busy, as shown in block 78, the next event list processing directs the network to forward the call to the IP, as shown in block 80. If the subscriber line is not busy, the network will connect the call to the subscriber, as shown in block 82, and set a monitor on the subscriber line to report when it is idle, as shown in block 84. When the call is completed and the subscriber line becomes idle, as shown in block 86, the network checks to see if there are any calls left in queue, as shown in block 88. If there are no calls in queue for the subscriber, this process ends. If there are other calls in queue, the IP is directed to deliver the call from the queue to the subscriber, as shown in block 90. The process continues from block 82 and repeats as previously described.

Calls that are forwarded to the IP as shown in blocks 74 and 80 are connected and the caller is given a choice of treatments, as shown in block 92. If the caller elects to leave a message, as shown in block 94, the IP forwards the call to a messaging system, as shown in block 96. If the caller elects an alternate destination, as shown in block 98, then the IP forwards the call to that telephone line, as shown in block 100. The caller then can elect to disconnect or to be placed in queue and hold waiting for the subscriber line to become idle, as shown in block 102. Once the subscriber line becomes idle, the process continues from block 86 as previously described.

Thereafter, answer supervision is forwarded to the IP, the subscriber is connected to the IP and an announcement is played telling the subscriber the number of calls currently stacked (waiting in queue). The call is then transferred at the host COS where the caller and subscriber are connected.

Various enhancements and modifications of the above-described method are, of course, contemplated. For example, when a caller attempts to call a subscriber and all lines are busy, the IP may be programmed to state a listed directory name, if recorded, and/or an announcement indicating that all lines are busy. The caller may then be placed into queue and allowed to exit by pressing a designated number such as, for example, "1" on the caller touch tone phone to leave a message, if the subscriber has a messaging number associated with their service. As part of the invention, the IP will then attempt to complete the call and, if successful, the service will end the query and allow the caller and subscriber to maintain their voice connection until terminated by one of the parties.

In the event that the lines are still busy, the caller will remain in queue at the IP. Announcements may, of course, be placed to the caller, indicating that the lines are still busy. The caller will then be provided with the option to exit and leave a message, if the subscriber has a messaging number. Additional calls that are routed to the IP on a busy condition will be placed in order behind existing calls in queue. If a subscriber has a messaging number and the caller presses "1", for example, on a touch tone phone, the caller will be transferred directly to the subscriber messaging service. Once the caller is transferred to the voice messaging system, the call is complete and the IP will allow the caller to remain connected until the call is terminated by the caller or the messaging system or service. The caller can, of course, hang up on the telephone at any time to disconnect the call.

Other anticipated enhancements include subscriber controlled queue slot sizing, music on hold, subscriber recorded announcements, priority queuing, MIS reports which provide the subscriber an indication of how many calls are on hold and how long they are waiting by hour, as well as an indicator tone or visual indication which will alert the subscriber that there are calls holding at the IP.

Figure 5:
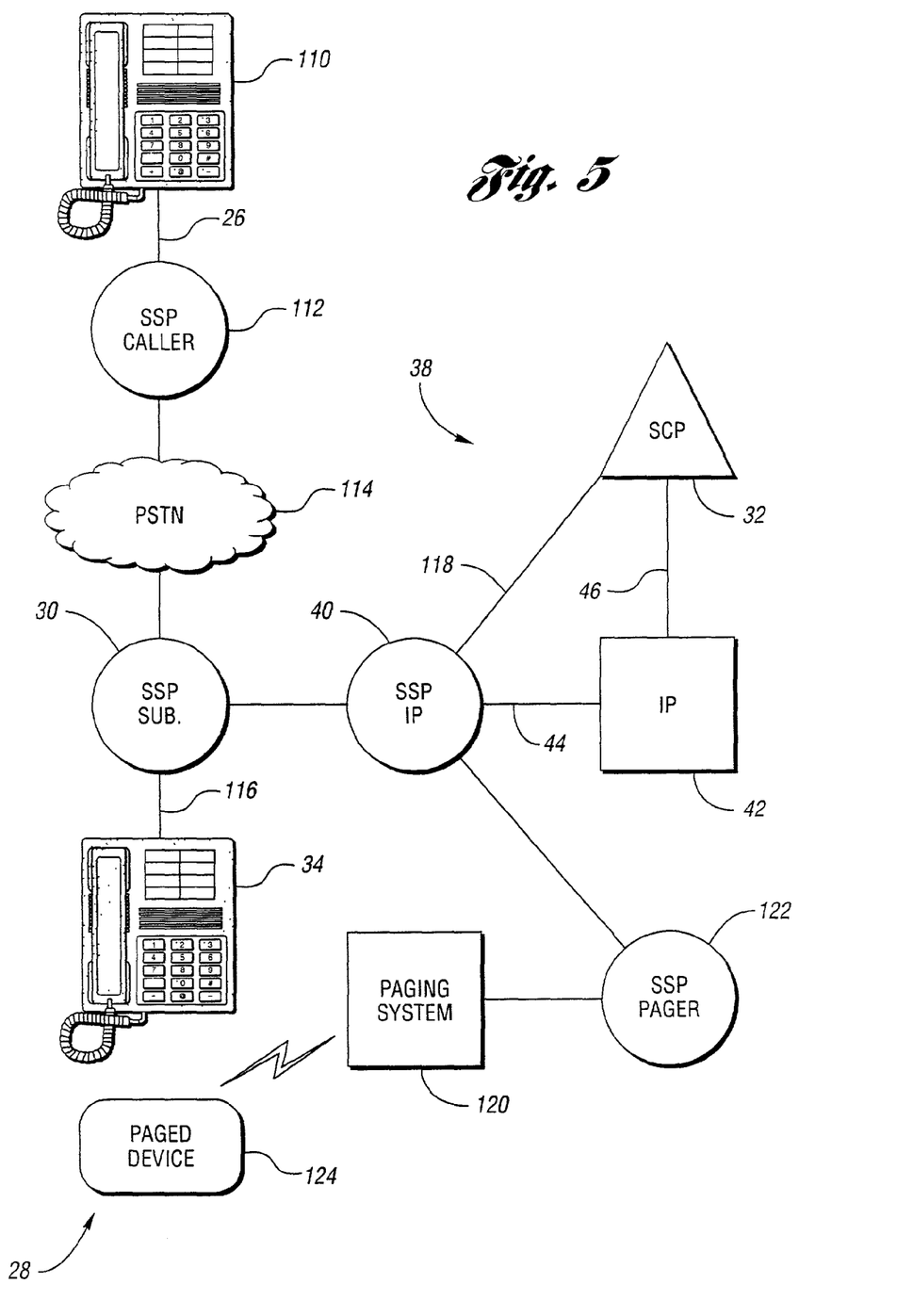
FIG. 5 is a block diagram illustrating a telecommunications-based queuing system with paging status notification capability according to an embodiment of the present invention.

Referring now to FIG. 5, a block diagram illustrating a telecommunications-based queuing system with paging status notification capability according to an embodiment of the present invention is shown. A caller, indicated by CPE device 110, accesses queuing system 28 through caller SSP 112. Caller SSP 112 is linked to other central office switches through telecommunications routing network 114. Subscriber 34 receives calls placed by caller 110 through subscriber SSP 30. Intelligent peripheral 42 queues calls placed by callers 110 when the one or more subscriber lines 116 are busy or otherwise unavailable. IP 42 is connected to callers 110 and subscribers 34 through IP SSP 40. SCP 32 communicates with switching elements in queuing system 28 through signaling connections, one of which is indicated by 118. Typically, the signaling connections pass through one or more STPs 18, not shown for clarity. In this embodiment, queuing system 28 includes paging system 120 connected to AIN network 38 through pager SSP 122. It will be recognized by one of ordinary skill in the art that SSPs 30, 40, 112, 122 are interconnected for calling information through telecommunications routing network 114 and interconnected for signaling information by a Signaling System 7 system, much of the details of which have been omitted for clarity. Further, one or more of SSPs 30, 40, 112, 122 could be implemented as a single SSP, central office, or other switching functionality.

Paging system 120 receives paging requests through SSP pager 122 and transmits paging information to a wireless page device 124. Page device 124 may be incorporated into subscriber CPE device 34, may be a standard pager, or may be a special display device capable of displaying a plurality of paged messages simultaneously. Thus, subscriber 34 can receive information about the status of calls from caller 110 queued in IP 42 through paging system 120.

Referring now to FIG. 6, a flow diagram of queued call status notification according to an embodiment of the present invention is shown. The notification method described may be implemented, for example, within block 102 of FIG. 4.

A check is made to determine if outcall subscriber notification should occur in block 130. This check is made at some point after a call placed by caller 110 is received by IP 42 for queuing. The method of delivery of the call to IP 42 may vary. Several types of checking are possible. For example, SCP 32 may contain service logic to determine if subscriber 34 has requested outcall notification. Also, subscriber 34 may request status information about priority handling of only certain callers 110. If caller 110 is on a prioritization list, outcall notification is triggered. If outcall notification is not triggered, the method ends.

If outcall notification is triggered, SCP 32 instructs IP 42 to out-dial a telephone number supplied by subscriber 34 in block 132. Information about caller 110 is typically supplied in this second, separate call. For example, caller ID is provided, as available per regular caller ID privacy regulations, using the telephone number of calling party 110 and not of IP 42.

A check is made to determine if a paging system was dialed in block 134. When IP 42 receives answer supervision, SCP 32 follows different paths based on configuration information about subscriber 34 as to whether the number dialed is to paging system 120, to subscriber 34, or the like. If the dialed number is to paging system 120, IP 42 outpulses DTMF information in block 136. This information may include a personal identification code for page device 124, a special identifying sequence of digits that identifies the page as originating from the queuing service, the telephone number of calling party 110, caller ID associated with caller 110, and the like. Caller 110 is then placed in queue in block 138. SCP 32 continues interaction with IP 42 to place caller 110 within IP queue 43.

Several options exist if the outcall from IP 42 is placed to subscriber 34, as indicated by block 140. For example, if subscriber 34 has requested immediate delivery of high priority callers 110 and caller 110 is on the high priority list, caller 110 is connected to subscriber 34 using the separate outcall line. If caller 110 is not to be immediately delivered, a message is played in block 142. For example, IP 42 plays an announcement to subscriber 34 that identifies caller 110 and then terminates the separate call. Caller 110 is then placed in queue in block 138. SCP 32 continues interaction with IP 42 to place caller 110 within IP queue 43.

As will be recognized by one of ordinary skill in the art, many options and embodiments are within the scope of the present invention. For example, if the out-dialed telephone number is not to paging system 120, subscriber 34 may refer to the caller ID display unit to determine who is being placed into queue. The subscriber may also then be given the option of providing special handling commands to preferred callers. For example, subscriber 34 may answer the IP-placed call and enter certain DTMF digits to inform queuing service 28 that calling party 110 should receive priority handling. One method of priority handling is to directly connect caller 110 to subscriber 34 on the second line dialed by IP 42. Another option is to place calling party 110 at the front of queue 43 such that the next queued call delivered to subscriber 34 is caller 110.

A variety of means to notify subscriber 34 when calls have been held in queue for an extended period of time are also possible. For example, IP 42 can call subscriber 34 or paging system 120 when caller 110 has been holding for a particular amount of time. This amount of time may be a preset number of minutes, may be varied by subscriber 24 or may be based on information about caller 110 or the status of queuing system 28. Various embodiments are possible. For example, when calling paged device 124, the numeric message sent by IP 42 may contain the number of minutes caller 110 has been holding. Also, when directly calling subscriber 34, IP 42 may include the number of minutes in queue within the caller ID display. IP 42 may also include audible notification indicating the number of minutes on hold when calling subscriber 34.

IP 42 may also place the second call once or periodically after caller 110 has been holding for longer than a threshold amount of time. The threshold amount of time may be preset, may be varied by subscriber 24 or may be based on information about caller 110 or the status of queuing system 28. For example, subscriber 34 requests notification when any caller 110 has been in queue 43 for at least five minutes. When caller 110 attempts to call subscriber 34 with all subscriber lines 116 in use, IP 42 queues caller 110 without outcall notification at that time. Then, if caller 110 has been holding for five minutes, a notification call is placed by IP 42. Calls may be placed periodically thereafter until caller 110 leaves queue 43.

Subscriber 34 may also request that IP 42 notify subscriber 34 when a certain threshold in the number of calls on hold is exceeded. In this case, IP 42 calls once or periodically when more callers 110 are in queue 43 than the threshold allows. The threshold may be preset, varied by subscriber 34, or based on one or more conditions such as information about caller 110 or the status of queuing system 28. For example, subscriber 34 may purchase five queue slots and request notification when four of the slots are filled. When a fourth caller 110 is to be queued, IP 42 places the outcall as described above. If periodic notification is requested, queuing system 28 repeatedly calls until the number of callers 110 on hold is reduced below the threshold.

The embodiment illustrated in FIG. 6 indicates that a call is queued after placing a separate call indicating status of the queued subscriber line access call. Various other embodiments are possible. For example, the call may be queued prior to placing the separate call or in parallel with placing the separate call.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of call queuing notification implemented in a telecommunications advanced intelligent SS7 network, the method comprising:
   receiving a call to access a subscriber line;
   determining within the telecommunications SS7 network that the subscriber line is busy;
   placing the subscriber line access call in a queue associated with the subscriber line, the queue implemented within the telecommunications SS7 network, the queue holding a plurality of calls to the subscriber line; and
   placing a separate call to the subscriber from the telecommunications SS7 network indicating status of the queued subscriber line access call.

2. A method of call queuing notification as in claim 1 further comprising determining that the subscriber has requested call notification before placing the separate call indicating queued subscriber line access call status.

3. A method of call queuing notification as in claim 1 wherein placing the separate call indicating queued subscriber line access call status is based on information about the received call.

4. A method of call queuing notification as in claim 1 wherein the queue is maintained in an intelligent peripheral.

5. A method of call queuing notification as in claim 4 wherein the intelligent peripheral is operative to call the subscriber and provide caller identification information.

6. A method of call queuing notification as in claim 1 wherein the separate call indicating queued subscriber line access call status is placed through a paging system.

7. A method of call queuing notification as in claim 1 further comprising receiving at least one command from the subscriber in response to placing the separate call indicating queued subscriber line access call status.

8. A method of call queuing notification as in claim 7 wherein the command connects the queued call to the subscriber over a line used to place the separate call.

9. A method of call queuing notification as in claim 7 wherein the command moves the queued call to the front of the queue.

10. A method of call queuing notification as in claim 1 wherein the separate call is placed substantially when the call to the subscriber is queued.

11. A method of call queuing notification as in claim 1 wherein the separate call is placed based on a length of time that the call to the subscriber is queued.

12. A method of call queuing notification as in claim 1 wherein the separate call is placed based on a number of calls queued.

13. A system for call queue notification implemented in an Advanced Intelligent Network (AIN) having at least one central office switch and a service control point in electrical communication with a plurality of subscriber switches via a signaling network, the system comprising an intelligent peripheral in electrical communication with the central office switch and the service control point, the intelligent peripheral equipped with queuing functionality for each subscriber operative to queue a plurality of calls to each subscriber, the intelligent peripheral operative to place a first call to the central office switch for receipt by a subscriber having a call placed in queue, the call placed in response to a determination that a line associated with the subscriber is idle, the intelligent peripheral further operative to place a second call providing status information to the subscriber about at least one queued call.

14. A system for call queue notification as in claim 13 wherein the intelligent peripheral is further operative to determine that the subscriber has requested call notification before placing the separate call indicating queued subscriber line access call status.

15. A system for call queue notification as in claim 13 wherein the intelligent peripheral places the second call based on information about at least one queued call.

16. A system for call queue notification as in claim 13 wherein the status information comprises caller identification information.

17. A system for call queue notification as in claim 13 wherein the second call is placed through a paging system.

18. A system for call queue notification as in claim 13 wherein the intelligent peripheral is further operative to receive at least one command from the subscriber in response to placing the second call.

19. A system for call queue notification as in claim 18 wherein the command connects a queued call to the subscriber over a line used to place the second call.

20. A system for call queue notification as in claim 18 wherein the command moves a queued call to the front of the queue.

21. A system for call queue notification as in claim 13 wherein the second call is placed substantially when the call to the subscriber is queued.

22. A system for call queue notification as in claim 13 wherein the second call is placed based on a length of time that a call to the subscriber is queued.

23. A system for call queue notification as in claim 13 wherein the second call is placed based on a number of calls queued.

24. A method for notifying a subscriber of queued call status, the call placed from a caller to a subscriber line, the call processed by an Advanced Intelligent Network (AIN) having at least one cental office switch and a service control point (SCP) in electrical communication with a plurality of subscriber switches via a signaling network, the method comprising:
   providing an intelligent peripheral within the AIN in electrical communication with the at least one cental office switch and the SCP, the intelligent peripheral equipped with queuing functionality operative to queue a plurality of calls to the subscriber;
   receiving a first call to access a subscriber line;
   determining that the subscriber line is busy;
   queuing the first call in the intelligent peripheral; and
   placing a second call from the intelligent peripheral to the subscriber indicating status of the queued first call.

25. A method for notifying a subscriber of queued call status as in claim 24, the method further comprising:
   monitoring the subscriber line to notify the SCP when the line is idle;
   placing a third call from the intelligent peripheral to the subscriber in response to a determination that the subscriber line is idle;
   forwarding answer supervision to the intelligent peripheral in response to the third call being answered by the subscriber; and
   transferring and connecting the subscriber and the caller at the central office switch.

26. A method for notifying a subscriber of queued call status as in claim 24, the method further comprising:
monitoring call signaling to detect a termination attempt trigger;
launching a query at the SCP for receipt by the intelligent peripheral requesting the queue status of the subscriber line in response to the detected termination attempt trigger;
forwarding the first call to the intelligent peripheral to be added to the queue in response to a determination that the queue is active;
delivering the first call to the subscriber and setting a next event list trigger to determine the status of a subscriber line in response to a determination that the queue is empty;
connecting the first call to the subscriber line in response to a determination that the line is idle; and
forwarding the first call to the intelligent peripheral to be placed in queue in response to a determination that the subscriber line is busy.

27. A method for notifying a subscriber of queued call status as in claim 24 wherein placing the second call is based on information about the first call.

28. A method for notifying a subscriber of queued call status as in claim 24 wherein the second call from the intelligent peripheral indicating status of the queued first call is placed to a paging system.

29. A method for notifying a subscriber of queued call status as in claim 24 further comprising receiving at least one command from the subscriber in response to placing the second call.

30. A method for notifying a subscriber of queued call status as in claim 29 wherein the command connects the queued first call to the subscriber over a line used to place the second call.

31. A method for notifying a subscriber of queued call status as in claim 29 wherein the command moves the queued first call to the front of the queue.

32. A method for notifying a subscriber of queued call status as in claim 24 wherein the second call is placed substantially when the first call is queued.

33. A method for notifying a subscriber of queued call status as in claim 24 wherein the second call is placed based on a length of time that the first call is queued.

34. A method for notifying a subscriber of queued call status as in claim 24 wherein the second call is placed based on a number of calls in the queue holding the first call.

35. For use in an Advanced Intelligent Network (AIN) equipped with termination attempt trigger (TAT) capability, the AIN having at least one central office switch and a service control point (SCP) in electrical communication with a plurality of subscriber switches via a signaling network, a method of notification about queuing of a telephone call from a caller to a subscriber telephone line comprising:
providing an intelligent peripheral within the AIN in electrical communication with the central office switch and the SCP, the intelligent peripheral equipped with queuing functionality for each of the subscribers operative to queue a plurality of calls to each of the subscribers;
monitoring signaling to detect a TAT trigger;
generating a first electrical signal for receipt by the SCP in response to the detected TAT trigger;
generating a second electrical signal at the SCP for receipt by the intelligent peripheral requesting status of a queue associated with the subscriber line;
generating a third electrical signal at the SCP for receipt by the subscriber switch instructing the subscriber switch to forward the call to the intelligent peripheral to be added to the queue in response to a determination that the queue is active; and
placing a call from the intelligent peripheral to a subscriber subscribing to the subscriber telephone line indicating status of the queued call.

36. The method of claim 35 wherein the AIN is further equipped with Next Event List (NEL) functionality, the method further comprising:
generating a fourth electrical signal at the SCP for receipt by the subscriber switch instructing the subscriber switch to deliver the call to the subscriber and to set a NEL to determine the status of the subscriber line in response to a determination that the queue is empty; and
connecting the call to the subscriber line in response to a determination that the subscriber line is idle.

37. The method of claim 35 further comprising:
generating a fifth electrical signal at the subscriber switch for receipt by the SCP in response to a determination that the subscriber line is busy;
generating a sixth electrical signal at the SCP for receipt by the subscriber switch instructing the subscriber switch to forward the call to the intelligent peripheral to be placed in the queue;
generating a seventh electrical signal at the SCP for receipt by the subscriber switch instructing the subscriber switch to set a monitor on the subscriber line and to notify the SCP when the line is idle;
generating an eighth electrical signal at the subscriber switch for receipt by the SCP in response to a determination that the subscriber line is idle;
generating a ninth electrical signal at the SCP for receipt by the intelligent peripheral instructing the intelligent peripheral to call the subscriber via the central office switch;
generating a tenth electrical signal at the central office switch for receipt by the intelligent peripheral to forward answer supervision to the intelligent peripheral in response to the call being answered by the subscriber; and
generating an eleventh electrical signal at the intelligent peripheral for receipt by the central office switch to transfer and connect the subscriber and the caller at the central office switch.

* * * * *